US00RE43842E

(19) United States
(12) Reissued Patent
Wallerstein et al.

(10) Patent Number: US RE43,842 E
(45) Date of Reissued Patent: Dec. 4, 2012

(54) PANORAMIC IMAGING SYSTEM

(75) Inventors: Edward P. Wallerstein, Pleasanton, CA (US); Robert G. Hoffman, Fremont, CA (US); Stanley P. DeMarta, Pleasanton, CA (US); Edward C. Driscoll, Jr., Portola Valley, CA (US)

(73) Assignee: B.H. Image Co. LLC, Wilmington, DE (US)

(21) Appl. No.: 12/057,867

(22) Filed: Mar. 28, 2008
(Under 37 CFR 1.47)

Related U.S. Patent Documents

Reissue of:
(64) Patent No.: 7,019,918
Issued: Mar. 28, 2006
Appl. No.: 10/462,074
Filed: Jun. 12, 2003

(51) Int. Cl.
*G02B 13/06* (2006.01)

(52) U.S. Cl. ..... 359/725; 359/718; 359/728

(58) Field of Classification Search ..... 359/725, 359/718; 348/36–39
See application file for complete search history.

(56) References Cited

U.S. PATENT DOCUMENTS 4,012,126 A * 3/1977 Rosendahl et al. ..... 359/725
5,473,474 A 12/1995 Powell
6,449,103 B1 9/2002 Charles
6,646,818 B2 11/2003 Doi
7,012,757 B2 3/2006 Wallerstein et al.
2004/0008407 A1 * 1/2004 Wallerstein et al. ..... 359/362

OTHER PUBLICATIONS

International Search Report and Written Opinion for PCT/US2004/018486 mailed Dec. 16, 2004.
International Preliminary Report on Patentability for PCT/US2004/018486 issued Dec. 13, 2005, (p. 1 only).

* cited by examiner

*Primary Examiner* — Jordan Schwartz

(57) ABSTRACT

A panoramic lens includes an aspherical convex surface and an aspherical concave surface. The convex surface includes a transparent portion and an internally reflective portion, and the concave surface also includes a transparent portion and an internally reflective portion. Light from a 360-degree surrounding scene enters the panoramic lens through the transparent portion of the convex surface, is reflected by the internally reflective portion of the concave surface, is reflected by the internally reflective portion of the convex surface, and exits the panoramic lens through the transparent portion of the concave surface as a narrow column of light beams. Light beams containing image data can be provided to the transparent portion of the concave surface, and those beams will follow this same optical path through the panoramic lens in reverse to project a panoramic image out from the transparent region of the convex surface.

28 Claims, 5 Drawing Sheets

Fig. 4
(AMENDED)
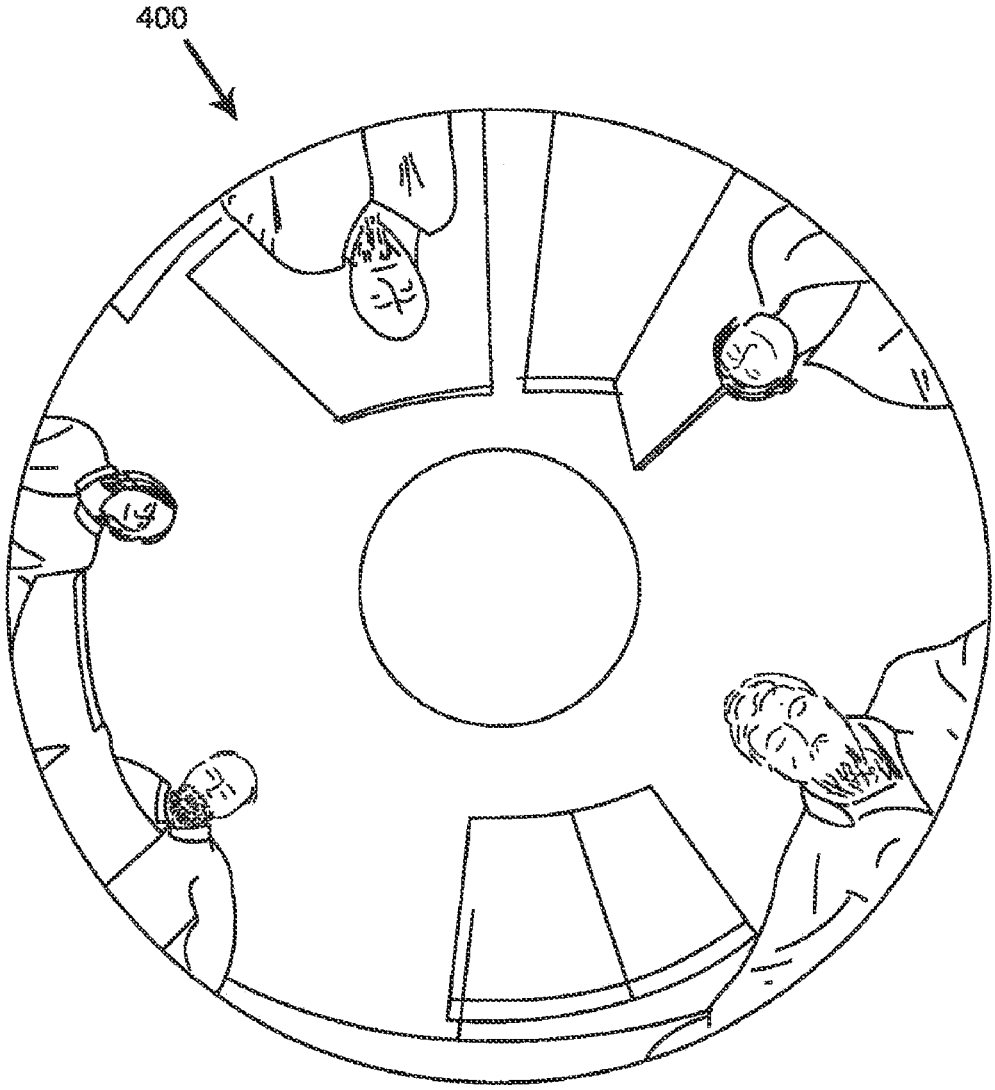

PANORAMIC IMAGING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to imaging systems, and in particular to a panoramic imaging system for capturing or creating a 360-degree surrounding panoramic scene.

2. Related Art

Panoramic imaging arrangements have become popular in recent years for purposes of viewing 360-degree surrounding panoramic scenes. Older generations of panoramic imaging arrangements generally consisted of revolving periscope-like constructions having relatively complex mechanisms for revolving them. More recently, stationary panoramic imaging arrangements have been developed.

A stationary panoramic imaging arrangement generally has one or more lenses, each having a vertical axis of revolution, which are used to refract or reflect light received from a 360-degree surrounding panoramic scene. The lenses alter the direction of the light, after which the light passes through a series of lenses-which are located vertically one above the other and which further manipulate the light by, for example, focusing the light.

The task of receiving light in a sideways direction and altering the direction of the light so that the light then proceeds in a vertical direction is a difficult one. Altering the direction of light to such a degree, especially when coming from a 360-degree surrounding scene, oftentimes leads to aberrations in the resulting light. Relatively complex lenses and lens arrangements have been developed to provide acceptable images from 360-degree surrounding scenes, but that complexity increases manufacturing and system costs.

Accordingly, it is desirable to provide a highly manufacturable lens system for capturing/projecting a 360-degree panoramic surrounding scene.

SUMMARY OF THE INVENTION

A "panoramic lens" is a lens that is capable of changing the substantially horizontal light from a 360-degree surrounding field into a substantially vertical single beam, and vice versa. A panoramic lens therefore enables the capture and projection of a 360-degree panoramic image.

According to an embodiment of the invention, a panoramic lens includes a convex surface about an axis of revolution (i.e., a surface having a convex profile in a plane of the axis of revolution) and a concave surface about the axis of revolution (i.e., a surface having a concave profile in a plane of the axis of revolution). The simple "two surface" construction of the lens beneficially allows the lens to be molded from plastic to simplify manufacturing and reduce cost.

The convex surface follows a first aspheric curve, while the concave surface follows a second aspheric curve. The convex surface is positioned above the concave surface and includes a transmissive portion surrounding an internally reflective portion. Similarly, the concave surface includes an internally reflective portion surrounding a transmissive portion.

When capturing or projecting a 360-degree panoramic image, light enters and exits the lens via the transmissive portions of the first concave surface and the second concave surface, and undergoes various internal reflections at the internally reflective portions of the convex and concave surfaces. For example, when capturing a 360-degree surrounding image, light enters the lens through the transmissive portion of the convex surface, is refracted towards the internally reflective portion of the concave surface, is reflected towards the internally reflective portion of the convex surface, is reflected towards the transmissive portion of the concave surface, and is refracted by the transmissive portion of the concave surface as it exits the lens. When projecting a 360-degree image, the light path is reversed.

By properly selecting the curvatures of the convex surface and the concave surface, any desired optical performance can be obtained from the panoramic lens. According to an embodiment of the invention, the transparent portion of the convex surface is preferably capable of receiving light for an unbroken included angle of at least 60 degrees in a vertical plane, with the included angle preferably extending from an angle below the horizon to an angle above the horizon.

According to an embodiment of the invention, a reflective coating is applied to the portions of the convex and concave surfaces to create the reflective surfaces, while the transmissive surfaces of the convex and concave surfaces are left "clear" (or coated with an anti-reflective coating to improve transmission). According to another embodiment of the invention, only those portions of the convex and concave surfaces that in the desired optical path are coated with the reflective or anti-reflective coatings. Portions of the lens that are not in the desired optical path are coated with an absorbing coating to minimize stray light within the lens, thereby enhancing imaging quality.

According to another embodiment of the invention, a panoramic lens includes two concave surfaces about an axis of revolution and a convex surface about the axis of revolution, the convex surface being positioned between the two concave surfaces. The upper concave surface includes an internally reflective portion, the convex surface includes a transmissive portion, and the lower concave surface includes both an internally reflective portion and a transmissive portion.

When capturing a 360-degree surrounding image, light enters the lens through the transmissive portion of the convex surface, is refracted towards the internally reflective portion of the lower concave surface, is reflected towards the internally reflective portion of the upper concave surface, is reflected towards the transmissive portion of the lower concave surface, and is refracted by the transmissive portion of the concave surface as it exits the lens. When projecting a 360-degree image, the light path is reversed.

According to another embodiment of the invention, a secondary imaging system can be positioned to receive the light exiting the transparent portion of the concave surface of the panoramic lens. The secondary imaging system can comprise a system of lenses or other optical elements (e.g., mirrors or filters) for focusing, correcting astigmatism, color correcting, creating a flat image plane, or otherwise managing the exiting light. The light can be focused onto a photosensing element, such as a chemical-based film or a digital image sensor.

According to another embodiment of the invention, the secondary imaging system can provide a source image to the transmissive portion of the concave surface of the panoramic lens for projection by the panoramic lens as a 360-degree surrounding image.

The present invention will be more fully understood in view of the following description and drawings.

BRIEF DESCRIPTION OF THE DRAWINGS

FIG. 4 is an example annular image that can be generated from a panoramic scene by the imaging system of FIG. 3, according to an embodiment of the invention.

DETAILED DESCRIPTION

Figure 1A:
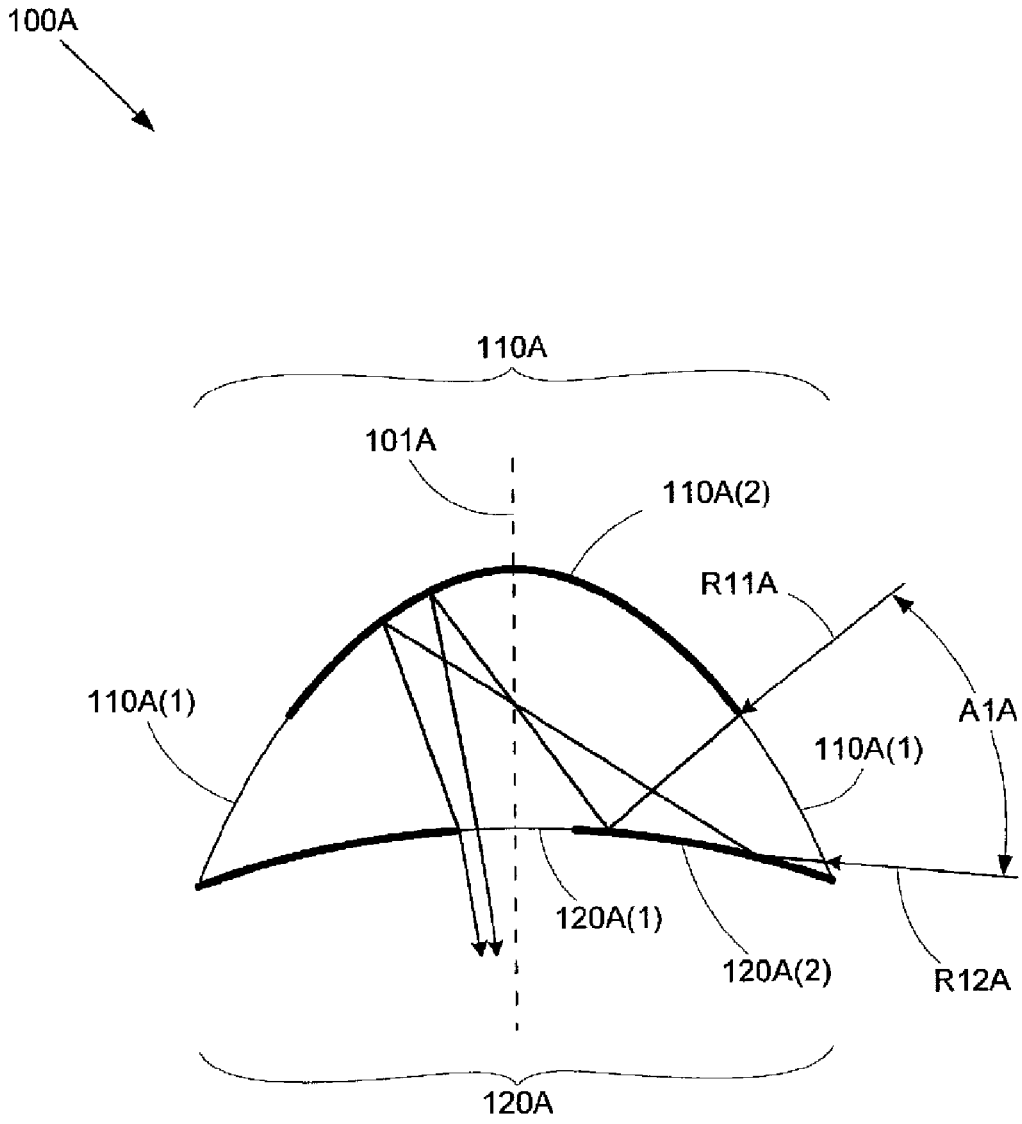
FIG. 1A a cross-section of a panoramic lens having a partially reflective, partially transmissive convex surface and a partially reflective, partially transmissive concave surface, according to an embodiment of the invention.

FIG. 1 shows a cross-section of a panoramic lens 100A according to an embodiment of the invention. Panoramic lens 100A is symmetric about an axis of rotation 101A and includes a convex surface 110A and a concave surface 120A. Convex surface 110A is "convex" since it exhibits a convex profile in a plane of axis of rotation 101A (i.e., a plane parallel to axis of rotation 101A). Similarly, concave surface 120A is "concave" since it exhibits a concave profile in a plane of axis of rotation 101A.

Convex surface 110A is an aspheric surface (i.e., the cross section of convex surface 110A follows a first aspheric curve) and includes a transmissive portion 110A(1) (indicated by the thin line) surrounding an internally reflective portion 110A(2) (indicated by the dark line). Concave surface 120A follows a second aspheric curve and includes an internally reflective portion 120A(2) (indicated by the dark line) surrounding a transmissive (or refractive) portion 120A(1) (indicated by the thin line).

Note that specific geometries of the first and second aspheric curves will depend on the overall design and desired performance of lens 100A. For example, an aspheric surface can be defined by the following equation:

$$z = \frac{\frac{h^2}{r}}{1 + \sqrt{1 - \frac{h^2}{r^2}(cc + 1)}} + Dh^4 + Eh^6 + Fh^8 + Gh^{10} \quad [1]$$

where:

$$h = \sqrt{x^2 + y^2} \quad [2]$$

and where x, y, and z are the Cartesian coordinates of the surface (x and y in the plane perpendicular to the axis of rotation and z parallel to the axis of rotation), and constants r (radius of curvature), cc (conical constant), D, E, F, and G (polynomial constants) are selected based on the desired characteristics of the aspheric surface. Note that, as indicated by Equation 1, an aspheric surface can even comprise a spherical surface (i.e., setting constants cc, D, E, F, and G equal to zero results in an equation for a sphere of radius r).

Table 1 provides sample constant values for a panoramic lens (e.g., lens 100A) having an axial thickness (i.e., thickness along axis of rotation 101A) of 18.171 mm, according to an embodiment of the invention. By incorporating the constant values in Table 1 into Equation 1, the dimensions of surfaces 110A and 120A can be determined.

TABLE 1

SAMPLE CONSTANT VALUES FOR EQUATION 1

| Constant | Surface 110A | Surface 120A |
|---|---|---|
| r | 11.531 mm | 15.802 mm |
| cc | −0.811179 | −4.817717 |
| D | $-8.3517 \times 10^{-7}$ $mm^{-3}$ | $6.7256 \times 10^{-7}$ $mm^{-3}$ |
| E | $3.0011 \times 10^{-10}$ $mm^{-5}$ | $3.3104 \times 10^{-10}$ $mm^{-5}$ |
| F | $2.1066 \times 10^{-13}$ $mm^{-7}$ | $2.0978 \times 10^{-13}$ $mm^{-7}$ |
| G | $5.9933 \times 10^{-21}$ $mm^{-9}$ | $1.1191 \times 10^{-21}$ $mm^{-9}$ |

Lens 100A is formed using an optically transparent material, and so internally reflective portions 110A(2) and 120A(2) can be created by covering the appropriate portions of lens 100A with a reflective coating that reflects light within lens 100A. The reflective coating can be any coating capable of creating an internally-reflective surface, such as standard High Reflective (H.R.) coatings (e.g., aluminum, silver, gold) that can be formed using vacuum, chemical, or even sputter deposition, among others. Meanwhile, transmissive portions 110A(1) and 120A(1) can simply be left uncoated, or can be coated with an anti-reflective (A.R.) coating to improve transmission characteristics.

In use, light from a 360-degree surrounding panoramic scene enters lens 100A through transparent portion 110A(1) of convex surface 110A. The entering light spans an unbroken included angle A1A that can include light rays from above the horizon (i.e., the plane perpendicular to axis of rotation 101A), such as light ray R11A, and light rays from below the horizon, such as light ray R12A.

When light enters transparent portion 110A(1), the light is refracted slightly downward at the convex surface towards internally reflective portion 120A(2) of concave surface 120A. The light is then reflected upwards by internally reflective portion 120A(2) towards internally reflective portion 110A(2) of convex surface 110A, which in turn reflects the light back downwards towards transmissive portion 120A(1) of concave surface 120A, where it exits lens 100A. Refraction at the curved surface of transmissive portion 120A(1) decreases the angle the exiting light rays make with axis of rotation 101A.

In this manner, a 360-degree surrounding scene can be captured into a narrow column of light beams by (monolithic) lens 100A without any additional optical elements. The exiting beams can then be manipulated and/or captured by secondary optics and an imaging system (both of which are described in greater detail below). Note that panoramic lens 100A can also project a 360-degree panoramic image from an image contained in a column of light beams. Directing the column of light beams at transparent portion 120A(1) of concave surface 120A(2) will cause the light to follow the same path within lens 100A described above with respect to the image capturing operation described, except in the opposite direction. Therefore, the light beams that enters lens 100A at transparent portion 120A(1) will be projected from transparent portion 110A(2) of convex surface 110A as a 360-degree panoramic image.

By incorporating both reflective and transmissive portions into both convex surface 110A and concave region 120A, panoramic lens 100A provides panoramic capture/projection capability in a simple layout. The two-surface design can be easily molded out of plastic for economical large-scale production, although any other optically transparent material (e.g., glass) could be used. Furthermore, according to various other embodiments of the invention, the panoramic lens can include additional surfaces/features.

Figure 1B:
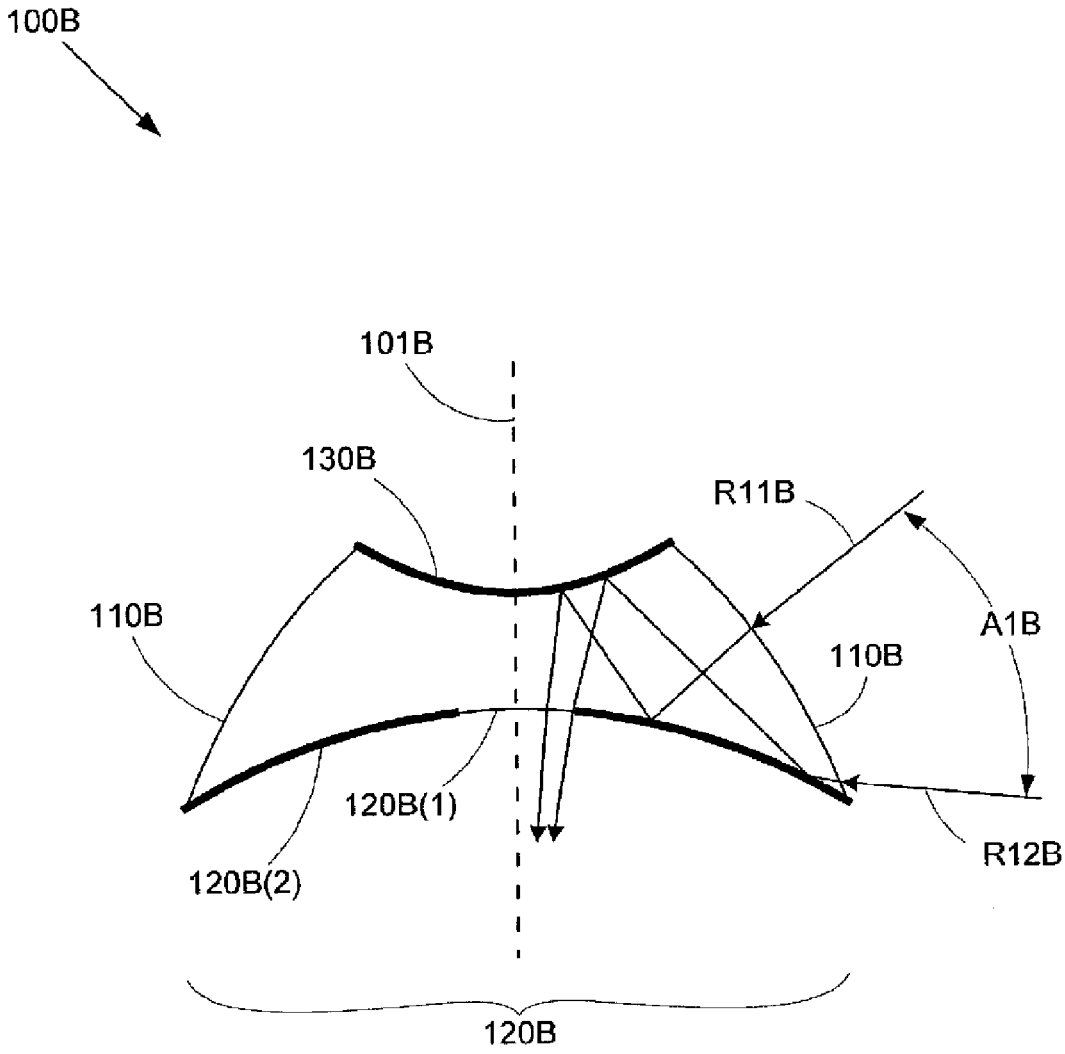
FIG. 1B is a cross-section of a panoramic lens having a reflective concave surface, a transmissive convex surface, and a partially reflective, partially transmissive concave surface, according to another embodiment of the invention.

For example, FIG. 1B shows a cross-section of a panoramic lens 100B in accordance with another embodiment of the invention. Panoramic lens 100B is symmetric about an axis of rotation 101B and includes a convex surface 110B, a lower concave surface 120B, and an upper concave surface 130B. Convex surface 110B is positioned between upper concave surface 130B and lower concave surface 120B. Each of the surfaces follows its own aspheric curve.

Convex surface 110B is transmissive (indicated by the thin line), upper concave surface 130B is reflective (indicated by the dark line), and lower concave surface 120B includes an internally reflective portion 120B(2) (indicated by the dark line) surrounding a transmissive portion 120B(1) (indicated by the thin line). Just as with lens 100A shown in FIG. 1A, reflective upper concave surface 130B and internally reflective portion 120B(1) can be formed by applying a reflective coating to lens 100B, while transmissive convex surface 110B and transmissive portion 120B(2) can be left clear or can be coated with an anti-reflective coating to improve transmission characteristics.

In use, light from the surrounding scene (e.g., the light spanning an included angle A1B bounded by light rays R11B and R12B) enters lens 100B through transparent convex surface 110B and is refracted towards internally reflective portion 120B(2) of lower concave surface 120B, which reflects the light towards upper concave surface 130B, which reflects the light back towards lower concave surface 120B. The light then exits lens 100B from transmissive region 120B(1) of lower concave surface 120B. In this manner, (monolithic) lens 100B captures (and similarly can project) a 360-degree surrounding panoramic scene into a column of light beams without requiring any additional optical elements. Note that the particular paths of light rays R11 and R12 shown in FIG. 1A (and any subsequent figures) are for exemplary purposes only, as the specific paths traced by individual lights rays will vary depending on the specific shape of the lens.

Figure 2:
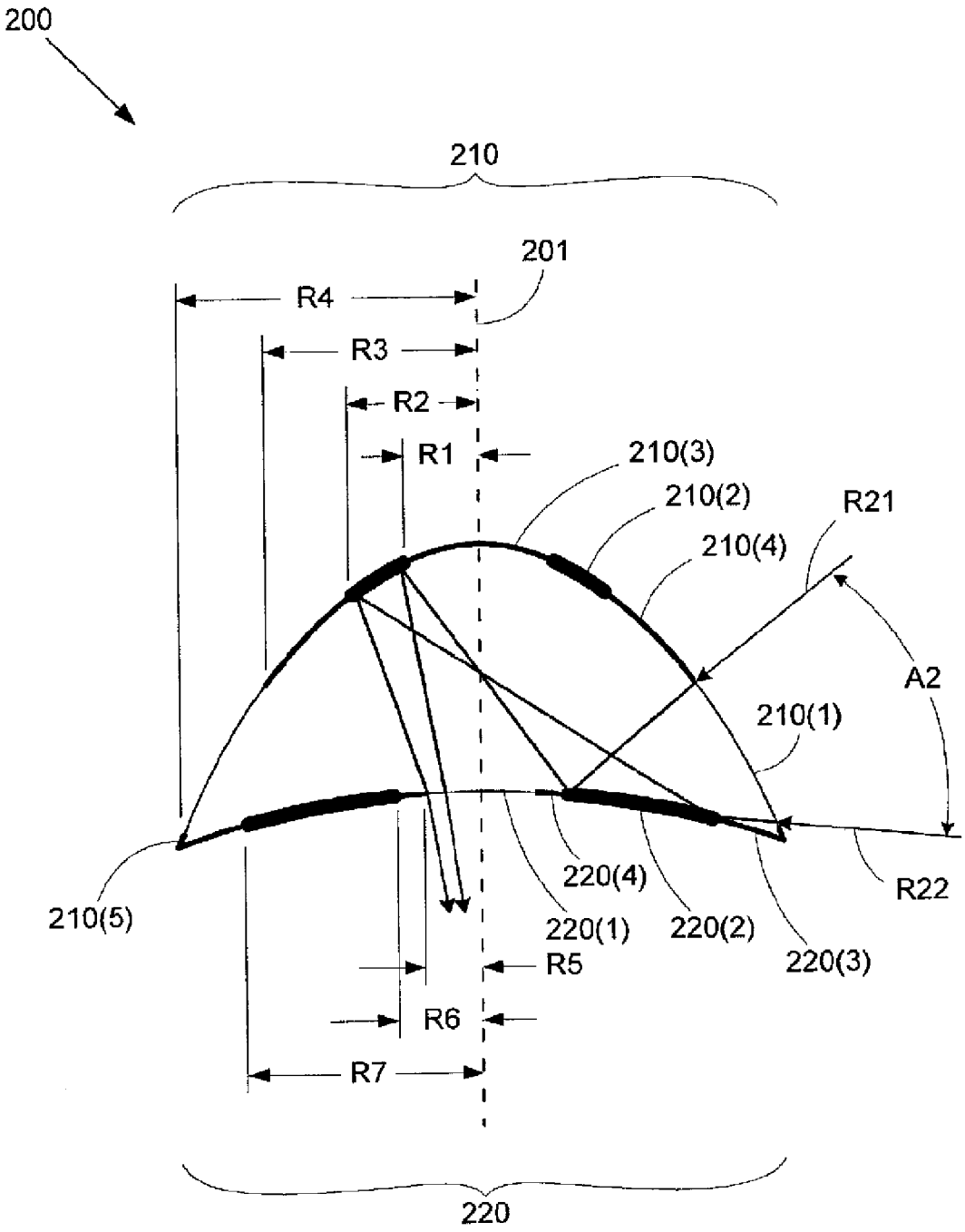
FIG. 2 is a cross-section of a panoramic lens having partially reflective, partially transmissive, and partially absorbing convex and concave surfaces, according to another embodiment of the invention.

FIG. 2 shows a cross-section of a panoramic lens 200 in accordance with another embodiment of the invention. Panoramic lens 200 is symmetric about an axis of rotation 201 and includes a convex surface 210 and a concave surface 220. In exterior form and basic operation, panoramic lens 200 is substantially similar to panoramic lens 100A shown in FIG. 1A. However, unlike lens 100A, only those portions of convex surface 210 and concave surface 220 in the desired optical path are made reflective or transmissive. Other portions of convex surface 210 and concave surface 220 are covered with an absorbing coating to minimize any stray reflected or refracted light that could degrade the imaging quality provided by lens 220.

For example, convex surface 210 includes a transmissive portion 210(1) (indicated by the thin line), an internally reflective portion 210(2) (indicated by the heavy line), and absorptive portions 210(3), 210(4), and 210(5) (indicated by the medium weight line). Thus, while transmissive portion 210(1) still surrounds internally reflective portion 210(2), the two portions are now separated by absorptive portion 210(4). Similarly, concave surface 220 includes a transmissive portion 220(1) (indicated by the thin line), an internally reflective portion 220(2) (indicated by the heavy line), and an absorptive portion 220(3) (indicated by the medium-weight line). The specific dimensions of the various transmissive, reflective, and absorptive portions of convex surface 210 and concave surface 220 can then be defined according to the desired optical path within lens 200. Those dimensions then determine the actual optical path followed by light in lens 200.

For example, if light rays R21 and R22 represent the boundaries of a desired included angle A2 for the 360-degree surrounding scene to be captured by lens 200, those light rays define the desired optical path within lens 200. Accordingly, transmissive portion 210(1) of convex surface 210 is sized to capture (or project) included angle A2 (i.e., sized just large enough to admit light within included angle A2 into lens 200). Thus, transmissive portion 210(1) is an annulus having an outer radius R4 and an inner radius R3, where radii R4 and R3 correspond to the points at which light rays R22 and R21, respectively, are incident on convex surface 210.

Internally reflective portion 220(2) of convex surface 220 then only needs to be large enough to reflect the light transmitted by transmissive portion 210(1). Internally reflective portion 220(2) is an annulus having an outer radius R7 and an inner radius R6, where radii R7 and R6 coincide with the points at which light rays R22 and R21, respectively, are incident on concave surface 220. Therefore, internally reflective portion 220(2) is sized to be equal to the area on convex surface 220 exposed to the light transmitted by transmissive portion 210(1) (i.e., the light from included angle A2).

In a similar manner, internally reflective portion 210(2) is an annulus having an outer radius R2 and an inner radius R1, with radii R2 and R1 bounding the portion of convex surface 210 on which the light reflected by internally reflective portion 220(2) is incident. Finally, transmissive portion 220(1) is a curved disc having a radius R5, wherein radius R5 is just large enough to allow all the light reflected from internally reflective portion 210(2) to pass through concave surface 220.

Note that the specific dimensions of transmissive portions 210(1) and 220(2) and internally reflective portions 210(2) and 220(2) depend on the desired size and optical characteristics of panoramic lens 200. For example, according to an embodiment of the invention, for a desktop conferencing application, the dimensions listed in Table 2, below, could be specified for the lens defined in Table 1.

TABLE 2

SAMPLE LENS DIMENSIONS

| Radius | Nominal Dimension |
|---|---|
| R1 | 1.67 mm |
| R2 | 6.91 mm |
| R3 | 13.90 mm |
| R4 | 20.86 mm |
| R5 | 3.74 mm |
| R6 | same as R5 |
| R7 | 15.72 mm |

All portions of lens 200 not in the desired optical path (i.e., absorptive portions 210(3), 210(4), 210(5), 220(3), and 220(4)) are coated with an absorbing layer such as black paint to absorb any stray light.

Note that to capture the desired included angle A2 for the 360-degree surrounding scene, transmissive region 210(1) extends almost but not quite to the actual intersection of convex surface 210 and concave surface 220. Similarly, internally reflective portion 220(2) of concave surface 220 does not extend all the way to the outer limits of concave surface 220. Therefore, according to various embodiments of the invention, the outer perimeter of lens 200 (i.e., the region in the vicinity of the intersection between convex surface 210 and concave surface 220) can be modified or even removed so long as the modification or removal does not interfere with the desired optical path of light within lens 200.

Figure 3:
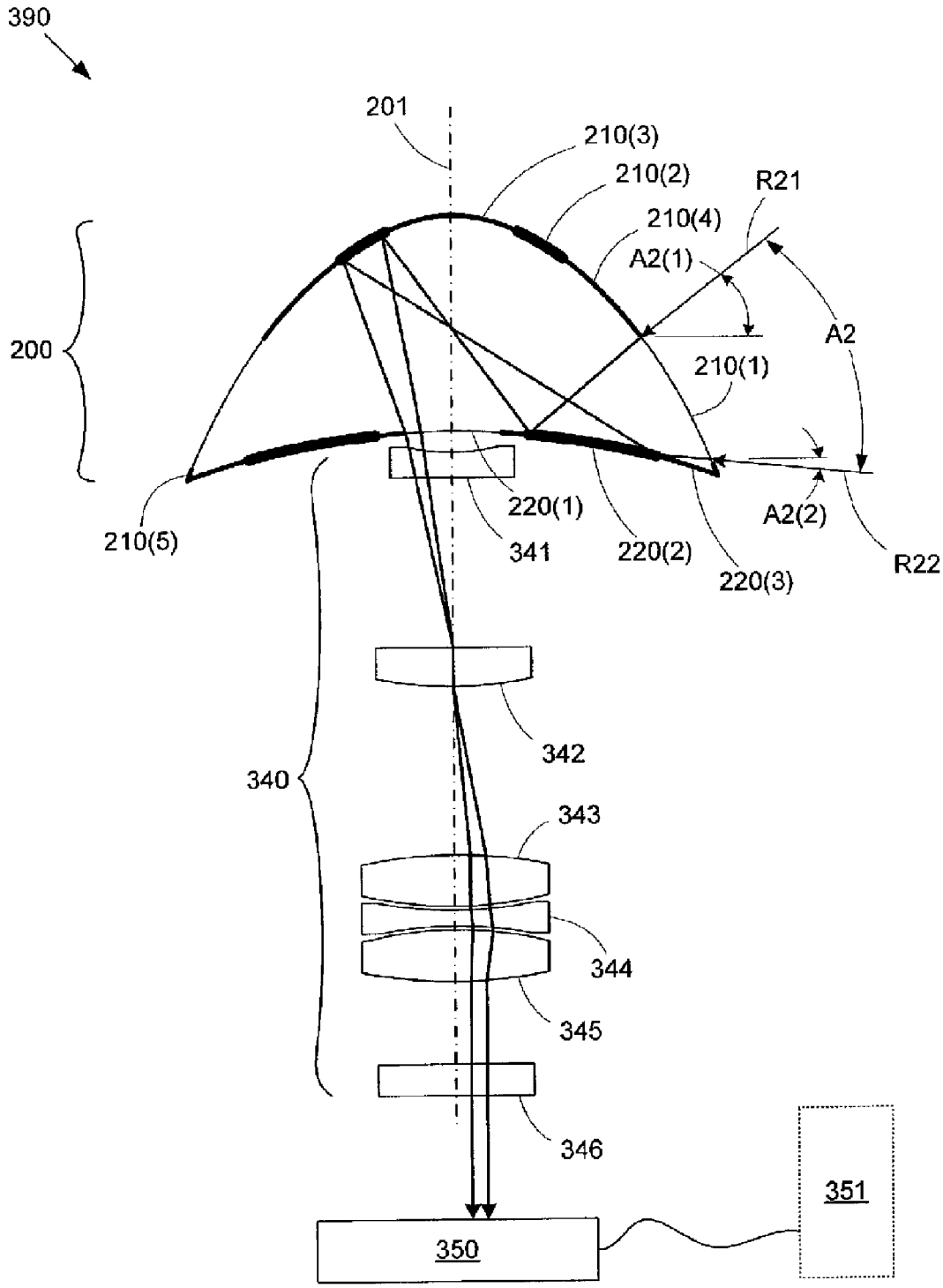
FIG. 3 is an imaging system including a panoramic lens according to an embodiment of the invention.

FIG. 3 shows an imaging system 390 for capturing (or projecting) a 360-degree surrounding scene, according to an embodiment of the invention. Imaging system 390 includes a panoramic lens 200, a secondary optical system 340, and an imaging device 350. Imaging device 350 can comprise any type of photosensing element, such as a photosensitive film (i.e., chemical based film) or a digital image sensor, and can be coupled to an optional image processor 351 (indicated by the dotted line) to provide additional digital image manipulation. Imaging device 350 could alternatively comprise a source beam generator for emitting a column of light beams containing image data that is passed by secondary optical system 340 to lens 200, which then projects the image data as a 360-degree panoramic scene.

Meanwhile, panoramic lens 200 in FIG. 3 is substantially similar to panoramic lens 200 described with respect to FIG. 2. The particular configuration (dimensions) of panoramic lens 200 will depend on the requirements of imaging system 390. For example, if imaging system 390 is a video conferencing system, panoramic lens 200 could be optimized to maximize the resolution of image data captured from an included angle (A2) substantially equal to 60-degrees—e.g., 45-degrees above the horizon (angle A2(1)) through 15-degrees below the horizon (angle A2(2)).

Secondary optical system 340 can include any number and type of optical elements. For exemplary purposes, secondary optical system 340 is depicted as including a field flattening lens 341, a scaling lens 342, a set of color correcting lenses 343, 344, and 345, and an IR (infrared) filter 346. Therefore, light from a 360-degree panoramic scene entering lens 200 via transparent region 210(1) and exiting from transparent region 220(1) is corrected for image flatness, scale, and color accuracy by secondary optical system 340 before being detected or captured by imaging device 350.

As is well known in the art, various other arrangements and/or selections of optical elements can be included in secondary optical system 340. Secondary optical system 340 simply provides an optical pathway (that can provide various types of optical manipulations) between panoramic lens 200 and image processing system 360. For example, FIG. 4 shows a sample image 400 that could be captured from a 360-degree surrounding scene by imaging device 350. Depending on the intended use of image 400, secondary optical system 340 could comprise any combination of optical elements for manipulating the image (e.g., focusing, astigmatism correcting, color correcting, image flattening, and/or diffracting lenses).

The various embodiments of the structures and methods of this invention that are described above are illustrative only of the principles of this invention and are not intended to limit the scope of the invention to the particular embodiments described. Thus, the invention is limited only by the following claims and their equivalents.

The invention claimed is:

1. A panoramic lens comprising a first aspheric surface about an axis of revolution and a second aspheric surface about the axis of revolution, wherein the first aspheric surface comprises a first transmissive portion and a first internally reflective portion, the first transmissive portion and the first internally reflective portion having a first continuous curvature, wherein the second aspheric surface comprises a second transmissive portion and a second internally reflective portion, the second transmissive portion and the second internally reflective portion having a second continuous curvature, and wherein the first aspheric surface contacts the second aspheric surface.

2. The panoramic lens of claim 1, wherein the first aspheric surface has a convex curvature in a plane of the axis of revolution, wherein the first transmissive portion surrounds the first internally reflective portion, wherein the second aspheric surface has a concave curvature in the plane of the axis of revolution, and wherein the second internally reflective portion surrounds the second transmissive portion.

3. The panoramic lens of claim 2, wherein the second internally reflective portion is adapted to reflect light between the first transmissive portion and the first internally reflective portion, and wherein the first internally reflective portion is adapted to reflect light between the second internally reflective portion and the second transmissive portion.

4. The panoramic lens of claim 3, wherein the first transmissive portion is sized to capture light from a first included angle of a 360-degree surrounding image.

5. The panoramic lens of claim 4, wherein light transmitted by the first transmissive portion into the panoramic lens is incident on a first region of the concave aspheric surface, and wherein the second internally reflective portion is substantially the same as the first region of the concave aspheric surface.

6. The panoramic lens of claim 5, wherein light reflected by the second internally reflective portion onto the first aspheric surface is incident on a second region of the first aspheric surface, and wherein the first internally reflective portion is substantially the same as the second region of the first aspheric surface.

7. The panoramic lens of claim 6, wherein light reflected by the first internally reflective portion onto the concave aspheric surface is incident on a third region of the concave aspheric surface, and wherein the second transmissive portion is substantially the same as the third region of the concave aspheric surface.

8. The panoramic lens of claim 7, wherein the first included angle is at least 60-degrees.

9. The panoramic lens of claim 2, wherein the first internally reflective portion and the second internally reflective portion are coated with a reflective coating, and wherein portions of the panoramic lens not included in the first transmissive portion, the second transmissive portion, the first internally reflective portion, or the second internally reflective portion are coated with an absorbing coating.

10. The panoramic lens of claim 9, wherein the first transmissive portion and the second transmissive portion are coated with an anti-reflective coating.

11. An imaging system comprising:

a panoramic lens;

an imaging device; and a secondary set of optical elements providing an optical path between a photosensing element and the panoramic lens, wherein the panoramic lens comprises:

a convex aspheric surface about an axis of revolution, the convex aspheric surface comprising a first transmissive portion surrounding a first internally reflective portion, wherein the first transmissive portion and the first internally reflective portion have a first continuous curvature; and a concave aspheric surface about the axis of revolution, the concave aspheric surface comprising a second internally reflective portion surrounding a second transmissive portion, wherein the second internally reflective portion and the second transmissive portion have a second continuous curvature, wherein the convex aspheric surface is in contact with the concave aspheric surface.

12. The imaging system of claim 11, wherein the second internally reflective portion is adapted to reflect light between the first transmissive portion and the first internally reflective portion, and wherein the first internally reflective portion is adapted to reflect light between the second internally reflective portion and the second transmissive portion.

13. The imaging system of claim 11, wherein the image processing system comprises a photosensing element for receiving light from the second transmissive portion via the secondary set of optical elements.

14. The imaging system of claim 13, wherein the secondary set of optical elements comprises at least one of a image flattening lens, a scaling lens, a color correcting lens set, an astigmatism correcting lens, a diffracting lens, and an infrared filter.

15. The imaging system of claim 13, further comprising a digital image processor coupled to the photosensing element for manipulating images captured by the photosensing element.

16. The imaging system of claim 11, wherein the image processing system comprises a source beam generator for providing source beams to the second transmissive portion via the secondary set of optical elements.

17. A panoramic lens comprising:

a first aspheric surface about an axis of revolution, the first aspheric surface comprising a first transmissive portion and a first internally reflective portion, wherein the first aspheric surface has a convex curvature in a plane of the axis of revolution, and wherein the first transmissive portion surrounds the first internally reflective portion; and a concave aspheric surface about the axis of revolution, the concave aspheric surface comprising a second internally reflective portion surrounding a second transmissive portion, wherein the second internally reflective portion is adapted to reflect light between the first transmissive portion and the first internally reflective portion, wherein the first internally reflective portion is adapted to reflect light between the second internally reflective portion and the second transmissive portion, wherein the first transmissive portion is sized to capture light from a first included angle of a 360-degree surrounding image, wherein light transmitted by the first transmissive portion into the panoramic lens is incident on a first region of the concave aspheric surface, wherein the second internally reflective portion is substantially the same as the first region of the concave aspheric surface, wherein light reflected by the second internally reflective portion onto the first aspheric surface is incident on a second region of the first aspheric surface, wherein the first internally reflective portion is substantially the same as the second region of the first aspheric surface, wherein light reflected by the first internally reflective portion onto the concave aspheric surface is incident on a third region of the concave aspheric surface, wherein the second transmissive portion is substantially the same as the third region of the concave aspheric surface, and wherein the first included angle is 60-degrees.

*18. An imaging system comprising:*

*a panoramic lens;*

*an imaging device; and*

*a secondary set of optical elements providing an optical path between a photosensing element and the panoramic lens, wherein the panoramic lens comprises:*

*a convex aspheric surface, the convex aspheric surface comprising a first transmissive portion surrounding a first internally reflective portion, wherein the first transmissive portion and the first internally reflective portion have a first continuous curvature; and*

*a concave aspheric surface, the concave aspheric surface comprising a second internally reflective portion surrounding a second transmissive portion, wherein the second transmissive portion and the second internally reflective portion have a second continuous curvature, and wherein the convex aspheric surface is in contact with the concave aspheric surface.*

*19. A panoramic lens comprising:*

*a first aspheric surface, the first aspheric surface comprising a first transmissive portion and*

*a first internally reflective portion, wherein the first aspheric surface has a convex curvature, and*

*wherein the first transmissive portion surrounds the first internally reflective portion; and*

*a concave aspheric surface, the concave aspheric surface comprising a second internally reflective portion surrounding a second transmissive portion,*

*wherein the second internally reflective portion is adapted to reflect light between the first transmissive portion and the first internally reflective portion,*

*wherein the first internally reflective portion is adapted to reflect light between the second internally reflective portion and the second transmissive portion,*

*wherein the first transmissive portion is sized to capture light from a first included angle of a 360-degree surrounding image,*

*wherein light transmitted by the first transmissive portion into the panoramic lens is incident on a first region of the concave aspheric surface,*

*wherein the second internally reflective portion is substantially the same as the first region of the concave aspheric surface, wherein light reflected by the second internally reflective portion onto the first aspheric surface is incident on a second region of the first aspheric surface,*

*wherein the first internally reflective portion is substantially the same as the second region of the first aspheric surface, wherein light reflected by the first internally reflective portion onto the concave aspheric surface is incident on a third region of the concave aspheric surface,*

*wherein the second transmissive portion is substantially the same as the third region of the concave aspheric surface, and*

*wherein the first included angle is 60-degrees.*

*20. A method of imaging comprising:*

*passing light through a transmissive portion of a convex surface;*

*refracting the light towards an internally reflective portion of the convex surface;*

*reflecting the light towards an internally reflective portion of the convex surface;*

*reflecting the light towards a transmissive portion of the concave surface; and*

*refracting the light with the transmissive portion of the concave surface,*

*wherein the transmissive portion and the internally reflective portion of the concave surface have a first continuous curvature, wherein the transmissive portion and the internally reflective portion of the convex surface have a second continuous curvature, and*

*wherein the convex surface is in contact with the concave surface.*

*21. The method of claim 20, wherein the concave surface comprises a first aspheric surface about an axis of revolution, and wherein the convex surface comprises a second aspheric surface about the axis of revolution.*

*22. The method of claim 20, wherein the transmissive portion of the convex surface is sized to capture light from a first included angle of a 360-degree surrounding image.*

*23. The method of claim 22, wherein the first included angle is at least 60-degrees.*

*24. The method of claim 20, further comprising imaging through use of a panoramic lens, wherein the internally reflective portion of the concave surface and the internally reflective portion of the convex surface are coated with a reflective coating, and wherein portions of the panoramic lens not included in the transmissive portion of the concave surface, the transmissive portion of the convex surface, the internally reflective portion of the concave surface, or the internally reflective portion of the convex surface are coated with an absorbing coating.*

*25. The method of claim 24, wherein the transmissive portion of the concave surface and the transmissive portion of the convex surface are coated with an anti-reflective coating.*

*26. The method of claim 20, further comprising imaging through use of a panoramic lens, wherein light transmitted by the transmissive portion of the convex surface into the panoramic lens is incident on a region of the concave surface, and wherein the internally reflective portion of the concave surface is substantially the same as the region of the concave surface.*

*27. The method of claim 20, wherein light reflected by the internally reflective portion of the convex surface onto the concave surface is incident on a region of the concave surface, and wherein the transmissive portion of the concave surface is substantially the same as the region of the concave surface.*

*28. The method of claim 20, wherein light reflected by the internally reflective portion of the concave surface onto the convex surface is incident on a region of the convex surface, and wherein the internally reflective portion of the convex surface is substantially the same as the region of the convex surface.*

* * * * *

UNITED STATES PATENT AND TRADEMARK OFFICE

CERTIFICATE OF CORRECTION

PATENT NO. : RE43,842 E
APPLICATION NO. : 12/057867
DATED : December 4, 2012
INVENTOR(S) : Wallerstein et al.

It is certified that error appears in the above-identified patent and that said Letters Patent is hereby corrected as shown below:

In the Claims

In Column 10, Line 61, in Claim 20, delete "the convex surface;" and insert -- a concave surface; --, therefor.

Signed and Sealed this
Twenty-eighth Day of May, 2013

Teresa Stanek Rea
*Acting Director of the United States Patent and Trademark Office*